United States Patent
Kopplin

(10) Patent No.: US 9,705,928 B2
(45) Date of Patent: *Jul. 11, 2017

(54) SYSTEM, ARRANGEMENTS AND METHODS RELATING TO ACCESS HANDLING

(71) Applicant: TELEFONAKTIEBOLAGET L M ERICSSON (PUBL), Stockholm (SE)

(72) Inventor: Dirk Kopplin, Ytterby (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/951,601

(22) Filed: Nov. 25, 2015

(65) Prior Publication Data

US 2016/0080427 A1    Mar. 17, 2016

Related U.S. Application Data

(63) Continuation of application No. 14/057,071, filed on Oct. 18, 2013, now Pat. No. 9,210,191, which is a
(Continued)

(51) Int. Cl.
| | |
|---|---|
| *H04L 29/06* | (2006.01) |
| *H04L 12/26* | (2006.01) |
| *H04L 12/54* | (2013.01) |
| *H04L 12/801* | (2013.01) |
| *H04L 12/927* | (2013.01) |

(Continued)

(52) U.S. Cl.
CPC .......... *H04L 63/20* (2013.01); *H04L 12/5695* (2013.01); *H04L 43/16* (2013.01); *H04L 47/10* (2013.01); *H04L 47/14* (2013.01); *H04L 47/15* (2013.01); *H04L 47/808* (2013.01);
(Continued)

(58) Field of Classification Search
CPC ..... H04L 12/5695; H04L 47/10; H04L 47/14; H04L 47/15; H04L 47/808; H04L 47/821; H04L 47/824; H04L 63/20; H04L 43/16; H04L 63/105; H04W 28/16
See application file for complete search history.

(56) References Cited

U.S. PATENT DOCUMENTS

| | | | |
|---|---|---|---|
| 7,733,891 B2 | 6/2010 | Reynolds et al. | |
| 8,218,503 B2 | 7/2012 | Terry et al. | |

(Continued)

FOREIGN PATENT DOCUMENTS

| | | |
|---|---|---|
| FR | 2859862 A | 3/2005 |
| WO | WO 2004/100466 A1 | 11/2004 |

*Primary Examiner* — Donald Mills
*Assistant Examiner* — Henry Baron

(57) ABSTRACT

A core network access packet data node and a core network access edge node are described herein. The core network access packet data node and/or the core network access edge node is/are adapted to hold or receive access priority related information comprising a subscriber related access allocation priority parameter relating to a subscriber requesting a network resource. Further, the core network access packet data node and/or the core network access edge node is/are adapted to have a preliminary access decision unit being provided for deciding if a network resource request is to be handled. Moreover, the core network access packet data node and/or the core network access edge node is/are adapted to have a final decision unit being provided for making a final decision relating to grant/rejection of a request to be handled, i.e. given preliminary access.

28 Claims, 7 Drawing Sheets

Related U.S. Application Data continuation of application No. 12/296,267, filed as application No. PCT/EP2006/061389 on Apr. 6, 2006, now Pat. No. 9,094,456.

(51) Int. Cl.
*H04L 12/911* (2013.01)
*H04W 28/16* (2009.01)

(52) U.S. Cl.
CPC .......... *H04L 47/821* (2013.01); *H04L 47/824* (2013.01); *H04L 63/105* (2013.01); *H04W 28/16* (2013.01)

(56) References Cited

U.S. PATENT DOCUMENTS

| | | |
|---|---|---|
| 2005/0135389 A1 | 6/2005 | Hurtta |
| 2008/0214220 A1 | 9/2008 | Beziot et al. |
| 2008/0235376 A1 | 9/2008 | Prytz et al. |

SYSTEM, ARRANGEMENTS AND METHODS RELATING TO ACCESS HANDLING

CLAIM OF PRIORITY

This application is a continuation application of U.S. patent application Ser. No. 14/057,071, filed Oct. 18, 2013, U.S. Pat. No. 9,210,191, issued Dec. 8, 2015, which is a continuation application of U.S. patent application Ser. No. 12/296,267, filed Oct. 6, 2008, now U.S. Pat. No. 9,094,456, issued Jul. 28, 2015, which is a 371 of PCT/EP06/61389 filed on Apr. 6, 2006. The contents of these documents are hereby incorporated by reference herein.

FIELD OF THE INVENTION

The present invention relates to a system comprising a core network access packet data node, a core network access edge node, which node may be separate or combined in one, means holding subscriber data and means holding policy related data and admission control means.

The invention also relates to a core network access packet data node in a communication network supporting communication of packet data as well as a core network access edge node. The invention further relates to a policy server node and to a method for controlling access to network resources in a network supporting communication of packet data which comprises at least a core network access packet data node and a core network access edge node, which nodes may be separate or combined in one, and means holding policy related data and means holding subscriber data.

STATE OF THE ART

Particularly services, such as emergency services, traditionally mainly rely on circuit switched voice. Today, however, there is a trend of using packet switched networks or IP networks instead of circuit switched networks for voice services. With the change to packet switched networks, voice services are controlled by IP Multimedia System (IMS)-like systems or run as peer-to-peer services. In addition to voice, data services such SMS, MMS, E-mails are gaining attention for emergency services. However, the use of packet switched networks, which traditionally were built for best effort services, require circuit switched solutions in order to be able to handle for example emergency communication in a reliable manner. This requires the network to be able to make prioritization of services and user categories in order to achieve a predictable end-to-end behavior, which is extremely important for such services.

However, network resources may more or less temporarily be scarce, the network may be overloaded etc. For services such as emergency services it is extremely important to be able to control resources and access to resources end-to-end and, in addition thereto, be capable to make resources free throughout or in part of the end-to-end chain connection in the network when needed, which hence has to be done for example for IP telephony and other IMS based services. This means for example that the network must be capable of quickly and reliably shifting resources dedicated to a bearer or service which are less important to more important bearers or services such as emergency calls or emergency data services, VIP user categories etc. when needed. A service may for example be number 112, 110 or 911 and a VIP user category may for example be a fire brigade, police, military etc. using any voice or data service.

In 3GPP ($3^{rd}$ Generation Partnership Project) a mechanism called Allocation Retention is defined to achieve resource control. However, current standardized procedures are based on static provisioning and do not have any service knowledge, which means that a 112 call cannot be distinguished from an ordinary call in a packet switched network. This actually means that all IP telephony calls are equal in terms of importance. In addition thereto emergency data services cannot be distinguished from non-emergency data services as long as they have the same priority in terms of quality of service (QoS). However, the same QoS priority does not mean that services are equally important.

The importance of a bearer on which the service is running, is linked to an IP PoP (Internet Protocol Point of Presence), i.e. APN (Access Point Name) and part of the subscriber profile. This means that all services provided from one and the same IP PoP have the same importance and consequently the same priority in terms of access to resources.

In a multi-service network, from where voice and other IP services are provided, this would give all services the same importance in access to resources and hence the network is not able to make any service differentiations. This is extremely disadvantageous and prevent packet switched networks from being used for example emergency services or other services requiring the end-to-end behavior to a high extent being predictable, or that a successful connection can be assured or more generally when control is needed to guarantee a service and/or a subscriber the desired outcome of a network resource request.

SUMMARY OF THE INVENTION

Therefore a system as initially referred to is needed through which packet switched networks reliably can be used also for handling communication requiring highly predictable end-to-end behavior. Particularly a system is needed through which emergency communication or similar can be given the appropriate priority while using a packet switched communication in all kinds of situations, such as when a network or part of a network or nodes in a network are overloaded, malfunctioning etc. Particularly a packet switched system is needed through which it is possible to make a prioritization of services and user categories.

Particularly a system is needed through which it gets possible to control resources and access to resources end-to-end, and even more particularly to be capable to free resources entirely or in parts of an end-to-end chain when needed. Particularly a system is needed which allows an efficient and secure resource control, particularly allowing distinguishing between services having the same QoS priority irrespectively of IP PoP or access APN. It is particularly an object of the invention to suggest a system through which service differentiation can be provided in a desired manner. Even more particularly it is an object of the present invention to provide a system providing service and subscriber awareness to the network in terms of importance and which allows handling during various network load conditions in a reliable end-to-end fashion and hence to provide a mechanism to handle for example emergency services and emergency situations in a very reliable manner.

Needed are therefore also nodes to be used in a network, particularly different kinds of core network nodes, through which one or more of the above mentioned objects can be achieved. Still further a method as initially referred to is needed through which one or more of the above mentioned objects can be achieved.

Therefore a system as initially referred to is provided wherein the core access packet data node is adapted to hold or receive subscriber related access allocation priority related information, particularly a subscriber related access allocation priority parameter relating to a subscriber or user requesting a network resource, preliminary access decision means being provided for deciding if a network resource request is to be handled or rejected, service allocation priority information holding means holding service priority related information for example comprising one or more parameters relating to service importance and/or user or subscriber category, and final decision means for making a final decision relating to grant or rejection of a handled, i.e. granted preliminary access network resource request, wherein said final decision means are comprised by the/an admission control means or in communication with an admission control means.

In one embodiment the core access packet data node comprises an SGSN (Serving GPRS Support Node). It may however also comprise a CGSN (Combined GPRS Support Node) including the functionality of a Serving GPRS Support Node and a Gateway GPRS Support Node for wireless 3G communication. It should be clear that the inventive concept also covers broadband communication in which case the core access packet data node may comprise a Digital Subscriber Line Access Management node (DSLAM) or a Broadband Access Server node (BRAS).

Particularly the access priority related information is held in the core access packet data node itself (particularly in the case of broadband system, although such a solution also is applicable in a wired system), or held in a separate node, for example in a HLR (Home Location Register), particularly in case of wireless communication. If held in a separate node or function, said node or function, for example HLR, is adapted to include said access priority related information in a message to the core network access packet data node, e.g. a response to a request, for example an update location request or similar.

In a particular implementation, for example in a 3G communication system or similar, the access priority related information comprises a so called Allocation Retention Priority (ARP) as e.g. described in 3GPP TS 29.060 v. 6.12.0, rel. 6 (2006/03) Ch. 7.7.34 and 3GPP TS 23.107 v. 6.4.0, rel. 6, 2006/03, Ch. 6.5.1.

The preliminary access decision means are particularly adapted to decide if a network resource request is to be handled, i.e. processed or queued, or rejected. Particularly the preliminary access decision means comprise (first) preliminary access decision means provided in the core access packet data node. Particularly the preliminary access decision means also or alternatively comprise (second) preliminary access decision means provided in the core access edge node, if these are different nodes as is the case for example if the node is a CGSN. Most particularly specific preliminary access decision means are provided in each node, or a plurality of nodes, on the end-to-end path such that, if needed, an access request or a request for a resource can be rejected anywhere (by the respective preliminary decision means or by the respective final decision means) on the end-to-end path if needed, if for example on that particular path or part of the network the resources are scarce or if there is a failure and the priority as indicated by the access priority related information is not high enough with regard to the available resources or in general.

Particularly the preliminary access decision means, in whichever node where they are provided, may comprise comparing means adapted to compare a current network load with a given threshold value and to, if the current network load exceeds the given threshold value, decide that access requests or network resource requests, for which the access priority related information fulfils given criteria, for example comprise an access allocation priority parameter exceeding a given value, or defining a high priority are to be processed or queued, or to be rejected if the parameter does not have a sufficiently high value. Of course, if the priority is high enough, it may be decided that the request is to be handled irrespectively of which is the network load, meaning that permission should be given to pre-empt other bearers or connections. Particularly the access priority related information is defined per subscriber and access point, for example Access Point Name or IP Point of Presence.

Particularly the service related information is held and/or generated in a policy node for provisioning to a core node comprising the functionality of an access edge node or a core network gateway node although it may also be held and/or generated in such a core network access edge node according to different implementations. Particularly the service priority related information is provided to the core network access packet data node, if not the same as the core network access edge node and, if applicable, to a radio network node over which a communication path or network resource is requested if wireless communication is implemented, or an access node for non-wired access such that a respective final decision based on said service related information can be made consecutively in every node on the end-to-end path.

Particularly the service priority related information comprises a service priority parameter generated based on service importance and/or user category, a pre-emption allowability parameter with information about the extent to which the requested network resource or bearer may be pre-empted by others, and a pre-emption capability parameter with information about the extent to, and/or the conditions under which, the requested network resource, for example bearer, may require pre-emption of other, lower prioritized, network resources, e.g. bearers. In a particular implementation, in a 3G system or similar, the pre-emption allowability parameter comprises the so called vulnerability parameter and the pre-emption capability parameter comprises the so called capability parameter.

Particularly the preliminary decision means as well as the final decision means are provided in one or more (or all) of the nodes involved on the end-to-end path.

Through the inventive concept the information on which a final decision can be based is sufficient in order to allow for fulfillment of one or more of the objects of the present invention. Through the preliminary decision, it can also be avoided that low priority requests are processed at all under the certain circumstances thus saving resources and processing capacity in general.

A core access packet data node is therefore also provided which comprises preliminary access handling means comprising means for holding or being adapted to receive access priority related information comprising a subscriber and priority related access allocation parameter, network load information means for holding or getting information about current network load, preliminary access decision means adapted to be in communication with said network load information means and with said preliminary access handling means, which are adapted to decide if a network resource request is to be handled or rejected based on said access priority related information and said current network load. Advantageously the core access packet data node further comprises service allocation priority handling means adapted to hold service priority related information or to receive service priority related information comprising a number of parameters including service priority related parameters for example comprising one or more parameters generated based on service importance and/or user or subscriber category, and final decision means for making a final decision relating to grant/rejection of a request for a network resource. The core access packet node particularly comprises a packet data support node of a wireless network, for example an SGSN. It may also comprise a combined packet data support and gateway node of a wireless network, such as a CGSN. In another implementation it comprises a node of a broadband network, for example a DSLAM, BRAS or similar. Then the preliminary access handling may be excluded, i.e. there are no preliminary decision means etc.

In the case of a wireless communication network implementation, the subscriber related access allocation parameter is defined per subscriber and Access Point Name or IP PoP and for example comprises an ARP (Allocation Retention Priority) as defined in 3GPP or a similar parameter. The service priority related information particularly, in addition to a service priority related parameter, comprises a pre-emption allowability parameter and a pre-emption capability parameter. The pre-emption allowability parameter is a parameter defining to which extent the network resource or connection itself may be pre-empted by other higher prioritized services or bearers whereas the pre-emption capability is a parameter indicating to what extent and/or under to which conditions etc. it is allowed to order pre-emption of other connections or bearers.

Particularly the preliminary decision means are adapted to, if the current network load exceeds a given load threshold value, reject/allow network resource requests for which the access allocation priority parameter is below/over a given value or for a given relationship between the load threshold value and the access allocation priority parameter value, reject/allow a network resource request.

Particularly the core access packet data node is adapted to provide the access allocation priority parameter to a core access edge node, for example a GGSN (unless it also includes the functionality of said a node), to receive the service priority related parameters from the core access edge node or a policy node and to base the final decision on said service priority related information parameters and also to provide said service priority related information parameters to a radio network node. The radio network node may then, in turn, also make a final decision as far as it is concerned, which then may be the "ultimate" final decision for the bearer establishment.

The invention therefore also suggests a core network access edge node which comprises preliminary access handling means comprising means adapted to receive access priority related information comprising a subscriber related access priority allocation parameter or to generate such information itself, network load information means for holding or receiving current information about current network load, preliminary access handling means comprising preliminary decision means adapted to decide if a network resource request is to be handled or rejected based on said access priority related information and said current network load. Particularly it further (or exclusively) comprises service allocation priority handling means adapted to hold service priority related information or to receive service priority related information comprising a number of service priority related parameters including one or more parameters generated based on service importance and/or user or subscriber category, and final decision means for making a final decision relating to grant/rejection of a preliminary allowed request for a network resource, for example an access bearer or a communication path.

Particularly the core network access edge node comprises a packet data gateway node, for example a GGSN. In a wired, broadband, implementation it may for example comprise a so called BRAS. As far as the access allocation priority parameters and service allocation priority parameters are concerned they are the same as discussed above with reference to the core network access packet data node as well as the preliminary final decision means are similar. In an advantageous implementation the core network access edge node is adapted send a policy request, which may, but does not necessarily, include the access allocation parameter, to a policy node and to handle a response with a policy including the service priority related parameters from the policy node. Particularly the core network access edge node is adapted to provide the service priority related parameters to a core network access packet data node.

The invention also suggests a policy server node comprising policy holding means for holding policies which further comprises service allocation priority generating and holding means for generating service priority related parameters based on service importance and/or user subscriber category and which further comprises signalling means adapted to signal service related parameters comprising service priority parameters, pre-emption capability and pre-emption allowability parameters to other nodes, for example nodes acting as core network access edge nodes or core network access packet data nodes such as for example GGSNs, CGSNs, SGSNs, BRASs, DSLAMs etc. Particularly the signalling is adapted to include the service related parameters in messages being responses to policy requests or other messages from other nodes.

According to the invention therefore also a method as initially referred to is suggested which comprises the steps of; providing subscriber and access priority related information in or to at least the core network access packet data node when a network resource is requested; making a preliminary access decision to handle or reject the network resource request based on the subscriber and access priority related information and on current network load in the respective node or nodes, if the outcome of the decision is to handle the network resource request; providing service priority related information at least comprising one or more parameters relating to service importance and/or user/subscriber category at least in or to the core network access edge node and/or the core network access packet data node concerning the network resource request; making a final access decision in said respective node or nodes based on said service priority related information such that a prioritizing can be done based on service priority and/or subscriber/user category; if final access is granted; performing a bandwidth admission control and/or pre-emption of lower prioritized allocated network resources, and, if successful, activating the network resource.

Most particularly the method further comprises the step of; generating and holding service priority related information in a policy server node; providing the service priority related information to a node acting as a core network access edge node at reception of a policy request from said node, and; making a final access decision in said node. Most particularly the method comprises the step of; providing the service priority related information from the node acting as a core network access edge node to a node acting as a core network access packet data node in a response message to a request for a network resource, for example a create PDP context request. Even more particularly the method comprises the step of; providing the service priority related information from the node acting as a core network access packet data node to a radio network node; performing an admission control in said radio network node using said service priority related parameters, and; making a respective final access decision in said radio network node. Hence, particularly, if a preliminary decision is made to grant a request for access to network resource, a final decision is made in the respective nodes, particularly consecutively node by node along the end-to-end path. Even more particularly a preliminary decision is made consecutively in each node on condition that the preliminary decision was not rejected in the preceding node, in which case the procedure is terminated for that particular request.

BRIEF DESCRIPTION OF THE DRAWINGS

The invention will in the following be further described, in a non-limiting manner, and with reference to the accompanying drawings, in which.

DETAILED DESCRIPTION OF THE INVENTION

Figure 1:
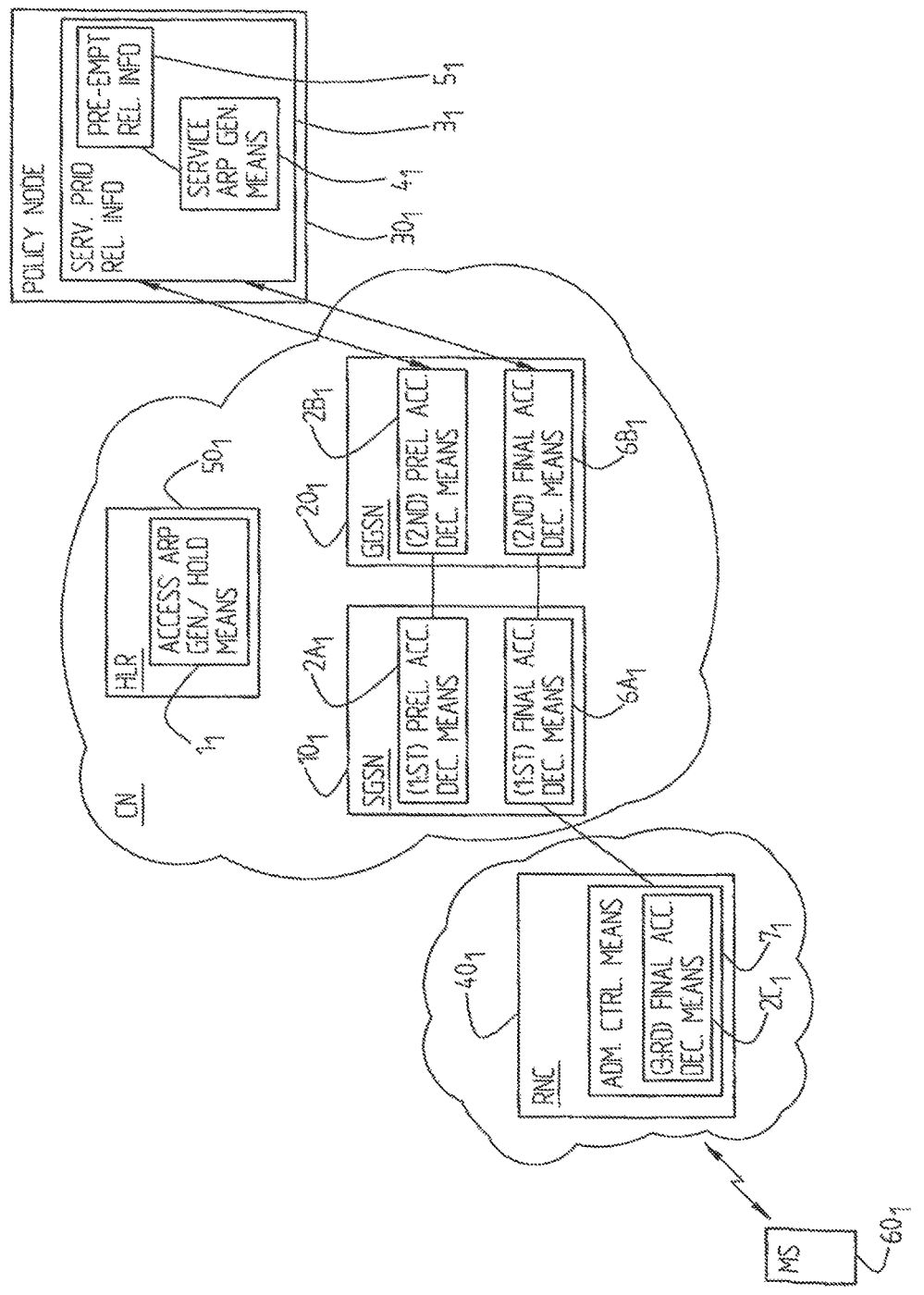
FIG. 1 is a very schematical block diagram of a system, here a wireless 3G system, in which the inventive concept is implemented.

According to the invention the access priority related information, for example comprising a subscriber and priority related access allocation priority parameter, is used for temporarily providing access allowance to network resources, if a given criterium is fulfilled for example in relation to the current network load. For final access prioritization new defined parameters which are service related, particularly at least a parameter relating to service importance and/or user/subscriber category for final access acceptance and admission control is used. Particularly a service priority related parameter defines the allocation retention priority for a service used by a user category. Several services can have the same service priority related parameter given they are of similar importance.

In a particular implementation the subscriber related access priority allocation parameter comprises the HLR based Allocation Retention Priority (ARP) existing in current 3GPP specifications as discussed earlier in the application. In such implementations is it here briefly called Access ARP whereas the service priority related parameter is denoted service ARP. It should be clear that normally these values are used in connection with wireless 3G networks.

Thus, the system may temporarily allow access to a network, for example a core network access packet data node, for example an SGSN or a CGSN. Such a decision is not definitive, i.e. a final decision is not made or can not be made in the respective node until the service ARP is received. Admission control for resource allocation, e.g. bandwidth is done when access acceptance is granted based on the service ARP or more generally the service priority related information comprising the service priority related parameter and possibly other parameters relating to pre-emption capability and allowability as discussed earlier in this application. This will keep the resource usage until the final decision and access permission is given down to a minimum which is extremely advantageous. However, in some implementations the system or the inventive concept can be used without regard of the subscriber related access allocation priority parameter which means that resource usage cannot be optimized to the same extent (except in broadband applications, where this is not a similar issue), but it is still advantageous since the end-to-end behavior can be guaranteed and predicted.

The preliminary decision to process or queue a bearer request in a node is based on the subscriber related access allocation priority parameter, particularly the Access ARP value. In heavy load situations, only requests having a high subscriber related access allocation priority parameter or a high Access ARP shall be processed. (In the following, for reasons of simplicity, the subscriber related access allocation priority parameter will be denoted the Access ARP even if it does not have to be ARP as defined in 3GPP and similarly the service priority related parameter will be denoted Service ARP.) Hence, Lower Access ARP requests may be rejected. The inventive mechanism allows the Core Network to keep control of the resources and discriminate between high and low prioritized user categories and services for preliminary or initial access permission. The Access ARP value can be defined per subscriber and IP PoP. The preliminary access permission does not give final access permission as it merely gives temporary access to the network until the final access decision relating to final access permission has been made.

Actually it merely (if granted) makes it possible to make a service priority based decision. Even if preliminary access permission is granted, the request may be rejected at a later state if the service ARP does not give enough priority, or even the initial access permission might not be given in every node on the end-to-end path, since preferably the procedure is performed in several nodes on the path.

Figure 4:
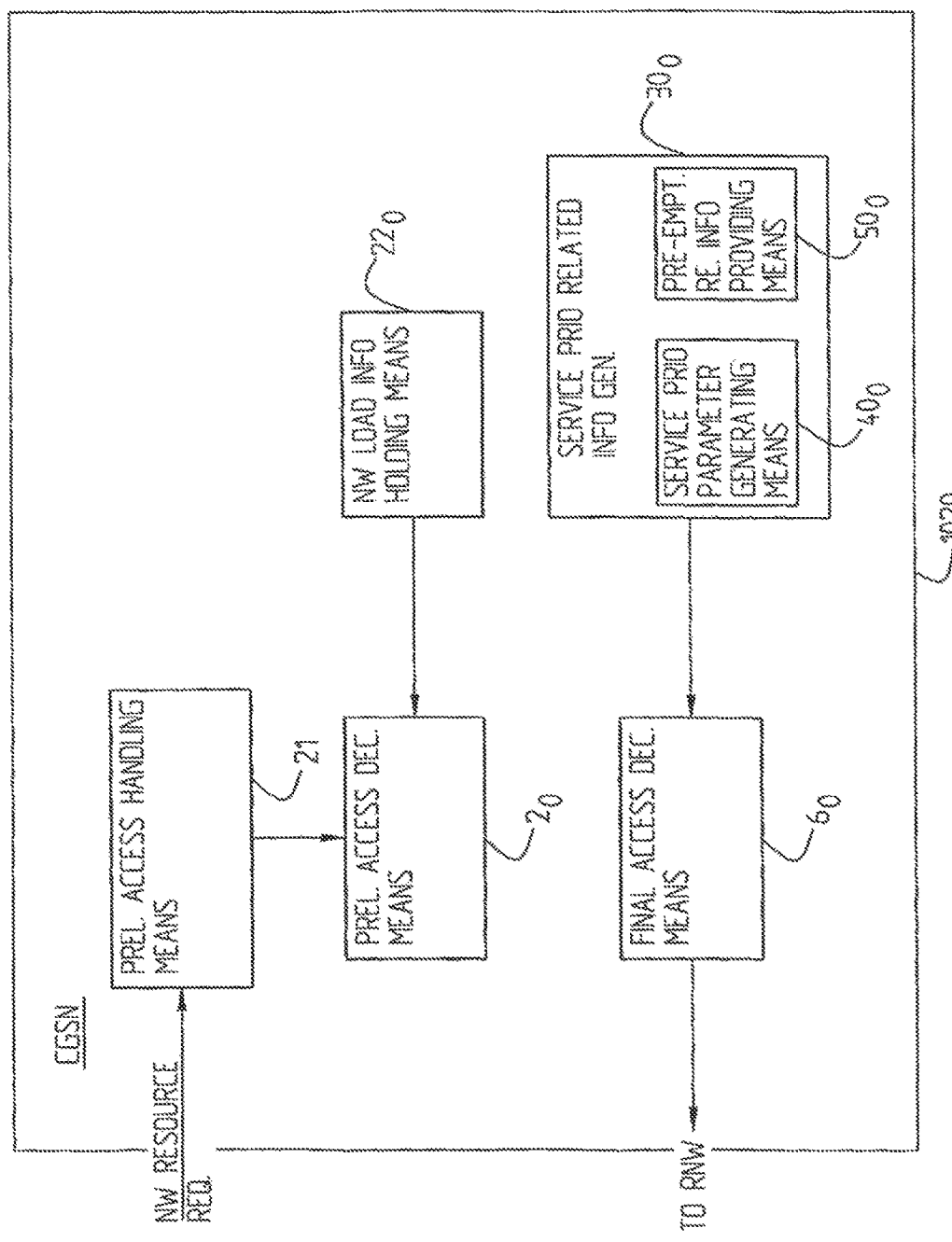
FIG. 4 is a very schematical block diagram of an implementation of the inventive concept in a CGSN.

According to different implementations the service ARP value is provisioned from the service network or from the core network access edge node, or even the core network access packet data node if it also includes the functionality of the former, see for example the case with an CGSN, e.g. FIG. 4, and the service priority related information is held or generated therein.

The service ARP is generated by taking the service importance and/or user category into account. This allows prioritizing not only on services but also on the user category using the service. As an example all services used by the fire brigade can be given a high service ARP, while for other subscribers only 112 or 911 services are given a high service ARP. The service ARP for ordinary subscribers using 112 or 911 may e.g. be lower than for any service used by the fire brigade. This is implementation specific and may be set and controlled in a desired manner.

Thus, according to the invention, the network must have at least one entity with service awareness, capable of signalling policies, or at least service priority related information, to other entities. In some implementations it is a policy server as in IMS like system or the access edge in non-IMS like systems.

Both entities need to be able to detect and provide service importance and may combine it with user subscriber categories, thus generate a service ARP. The service ARP is directly or node by node sent to other network entities and nodes in order to perform final access permission. In a wireless network the other network entities comprise entities or nodes in the core network and radio network nodes. In broadband networks it is for example BRAS (Broadband Access Service) or DSLAM (Digital Subscriber Line Access Management).

FIG. 1 shows one specific implementation of the inventive concept, in this particular case in a 3G network. It should be clear that nodes or entities etc. which are not directly involved in or necessary for carrying out the inventive concept and not necessary for its functioning are omitted for reasons of clarity.

Hence a core network CN is shown which comprises a core network access packet data node $10_1$ which here is supposed to be an SGSN. In addition to conventional functions and entities, which, as explained above, are not shown for reasons of clarity, the SGSN $10_1$ comprises preliminary access decision means $2A_1$ which here are denoted first such means because preliminary access means also are provided in the core network access edge node $20_1$ which is here supposed to be a GGSN and where they are denoted second preliminary access decision means. SGSN $10_1$ also comprises final access decision means (first) $6A_1$. It should be clear that in FIG. 2 a somewhat more detailed description of generally a core network access packet data node is described which of course also could be an SGSN, but in the schematical figure of FIG. 1, for reasons of clarity, it is most simplified. As a response to a message, e.g. a Location Update (provided to HLR upon reception a request for a network resource, e.g. a bearer, from, here, MS $60_1$, said (first) preliminary access decision means $2A_1$ receiving access priority related information, particularly a subscriber related access allocation priority parameter, which even may be the HLR based Allocation Retention Priority ARP, from Access ARP generating/holding means $1_1$ provided in HLR $50_1$. It should be clear that it does not have to be the "conventional" ARP, the abbreviation is used here for reasons of simplicity. The preliminary access decision means $2A_1$ in SGSN $10_1$ makes a preliminary access decision based on said information and on the current network load (and possibly additional alternative features) and provides the access priority related information or some other relevant access priority related information if the outcome of the decision is positive, i.e. preliminary access is granted as far as SGSN $10_1$ is concerned, to (here) GGSN $20_1$. GGSN $20_1$ also comprises preliminary access decision means $2B_1$ which functions in a similar way as the preliminary access decision means of SGSN. It should be clear that it does not have to be a GGSN but it could be some other core network access edge node or a node with a gateway functionality, or some intermediate node.

If also in GGSN $20_1$ preliminary access is granted, information thereon is provided to, here, policy node $30_1$. For example may the access priority related parameter be included in a policy request. However, it is not necessary to include the access priority related parameter in a request. Particularly no policy request is sent if the request is rejected in GGSN $20_1$ (or earlier, in SGSN $10_1$). Several possibilities are possible.

However, it is here supposed that in the policy node $30_1$ service priority related information means $3_1$ are provided. Service ARP generating means $4_1$ are provided for generating a service priority related parameter which is generated by taking the service importance and/or user category into account allowing prioritizing of services but also of user category using the service which most particularly defines the allocation retention priority for a service used by a user category and it is here briefly denoted service ARP. The policy node $30_1$ here also comprises pre-emption related information generating means $5_1$, here particularly the allowability or capability of requiring pre-emption of lower prioritized bearers or PDP contexts and the allowability to pre-emption requests made by higher prioritized bearers/PDP contexts. Thus, the service priority related information comprising service ARP and preferably also pre-emption related parameters is provided to final access decision means $6B_1$ in GGSN which then makes a respective final decision on access permission and resource allocation. It should be clear that in this particular case service ARP (as well as pre-emption related information parameters) are provided from the policy server node $30_1$. In another implementation one or more or all of these parameters may also be locally available in the access edge nodes which hence is equipped with service priority related information means.

The final access permission may require pre-emption of lower prioritized bearer/PDP contexts. When bandwidth allocation is requested this may be done at this stage in the (respective) final access decision means $6A_1,6B_1$. The service priority related information or parameters are thus signalled from the final access decision means $6B_1$ or more generally from GGSN to the final access decision means $6A_1$ in SGSN $10_1$ for, in a similar way making a final decision there as well. Subsequently the service priority related parameters are provided to admission control means $7_1$ in a radio network node, for example an RNC, Radio Network Control node comprising final access decision means $2C_1$ where a (last) final decision on access permission and resource allocation is made. Access permission and bandwidth allocation may require pre-emption of other lower prioritized bearers/PDP contexts.

Figure 2:
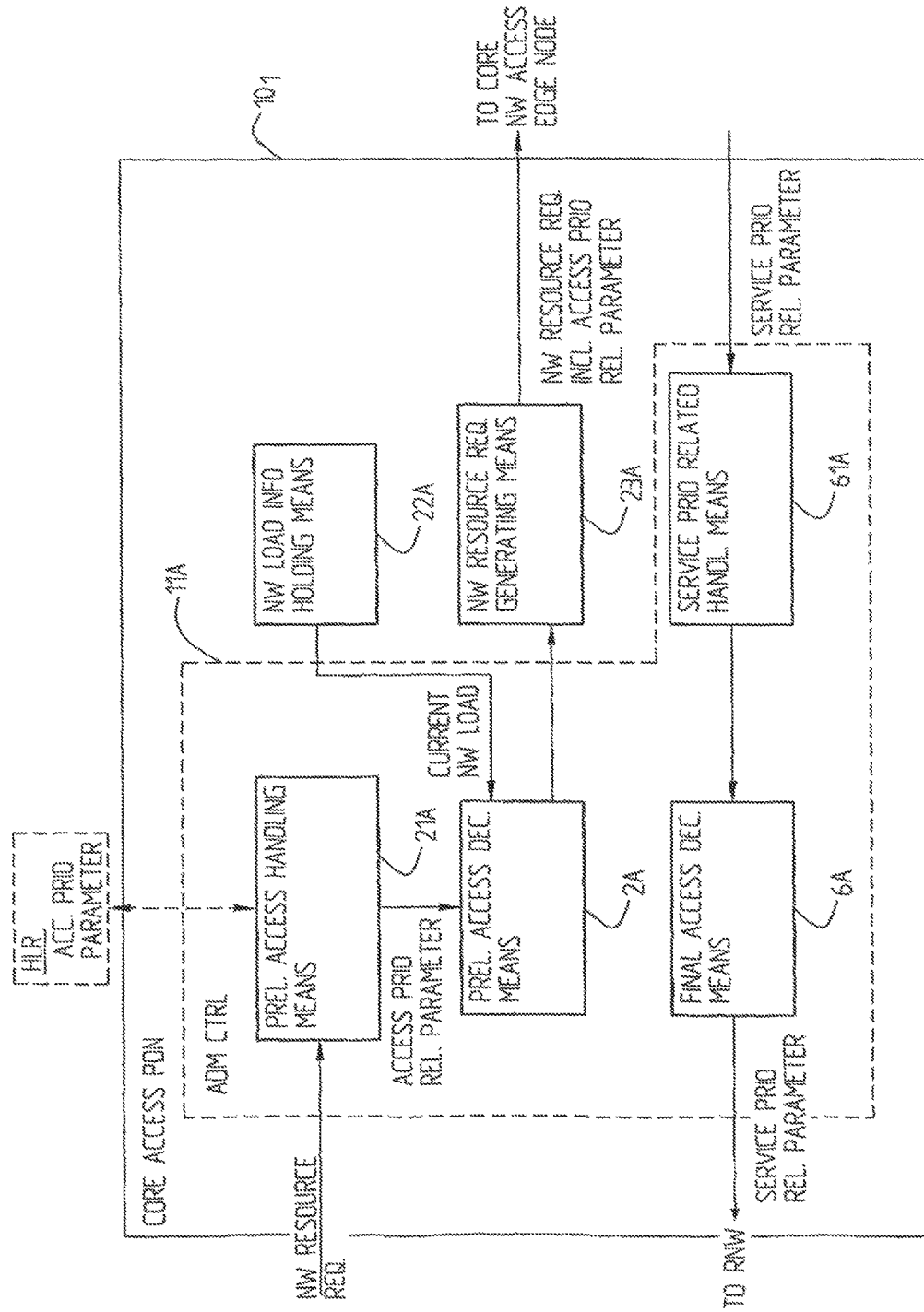
FIG. 2 is a very schematical block diagram of a core network access packet data node in an implementation of the inventive concept in a wireless network.

FIG. 2 schematically illustrates one implementation of a core network access packet data node (PDN) which may, but does not have to, comprise an SGSN (or a CGSN, cf. FIG. 4). It should be clear (not shown) that it also could be a node of a non-wireless network, for example a broadband network in which case it may comprise a so called DSLAM. For the purpose of the inventive concept it functions substantially in the same manner with the difference that the access priority related information generally is held in the node or in means associated with the node itself since there is no need for a HLR or similar. For broadband implementations the access edge node may be a BRAS or similar. It is also no need for providing parameters to a radio network.

Thus, supporting a wireless implementation, the core access packet data node 10 comprises preliminary access handling means 21A holding or fetching (receiving) access priority related parameters from for example HLR, (dashed lines) or actually held in the preliminary access handling means 21A themselves. The function of the preliminary access handling means may, instead of a separate means, be included in the preliminary access decision means 2A if the access priority parameters are provided from external means. The preliminary access decision means 2A receives or fetches information on the current network load from network load information holding means 22A in order to base a decision as to rejection or grant of preliminary access depending on the received subscriber related access priority parameter with respect to the current network load. According to predetermined criteria a decision of allowance or rejection of preliminary access is made depending on the relationship between the current network load and the access priority related parameter in a desired manner. For example a threshold may be given below which preliminary access is to be rejected. If, however, preliminary access is granted, information thereon is provided to a network resource request generating means 23A for sending a network resource request including the access priority related parameter to a core network access edge node. If, as will be more thoroughly described with reference to FIG. 3, preliminary access is granted by the core network access edge node, it is supposed that service priority related parameters are provided to service priority related handling means 61A (in case such parameters are not handled by the core access packet data node itself), and the service priority related parameters are provided to final access decision means 6A. A final access decision is then made in the final access decision means 6A and the service priority related parameters are provided to, here, the radio network.

Figure 3:
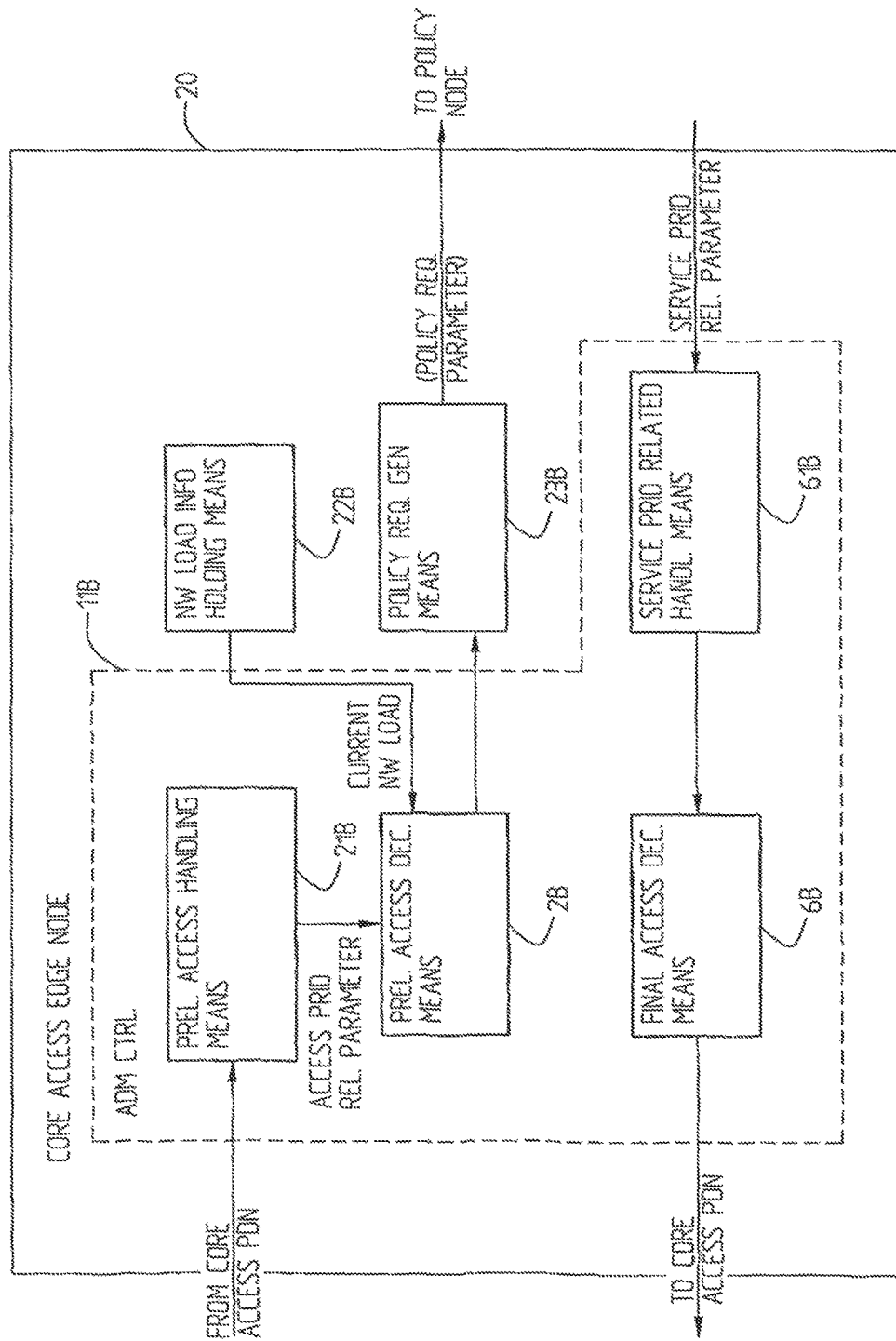
FIG. 3 is a very schematical block diagram of a core network access edge node in an implementation of the inventive concept in a wireless network.

FIG. 3 shows a core access edge node 20 which may communicate with the core access packet data node of FIG. 2. It is hence supposed that the access priority related parameter is received from the core access packet data node 10 in preliminary access handling means 21B similar to those of FIG. 2 but with the difference that the access priority related parameter is provided from the core access packet data node instead of from for example a HLR. If access is granted in preliminary access decision means 2B, information thereon is provided to policy request generating means 23B or the policy request generating means are activated and sends a policy request to a policy node, preferably, but not necessarily, containing the access priority related parameter. It is then supposed that the service priority related parameters are provided to service priority related handling means 61B in the core access edge node 20, from where they are provided to final access decision means 6B similar to those described with reference to FIG. 2 (in the core access packet data node) where a final decision is made and, if final access is granted in the core network access edge node, the service priority related parameters are provided to the core access packet data node.

Figure 5:
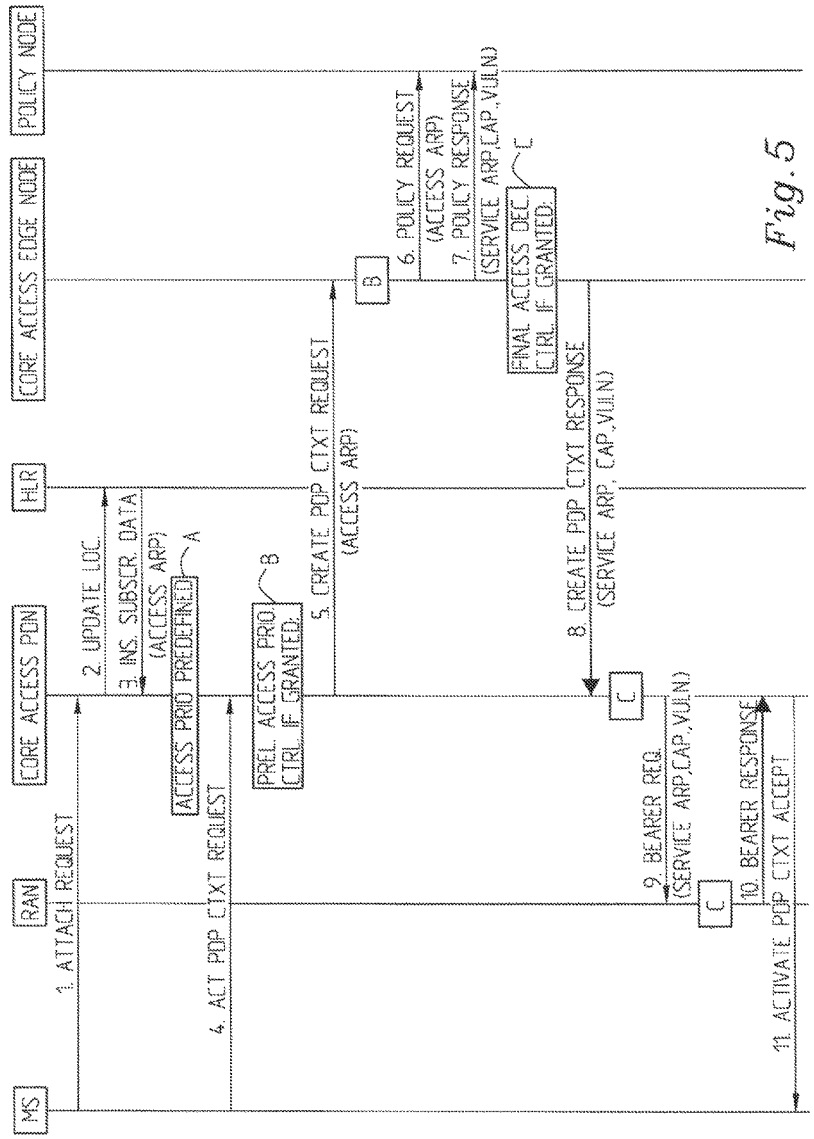
FIG. 5 is a sequence diagram describing the signalling in a system in which the inventive concept is implemented according to one particular embodiment, FIG. 6 schematically illustrates the procedure in a node for taking a preliminary decision based on access priority related information, and FIG. 7 schematically illustrates the procedure for taking a final decision based on service priority related information in a node.

With reference to FIG. 5 below examples are given of how, in for example a 3G network, the new additional parameters are provided in messages between the different nodes. It should be clear that also other messages could be used for providing the respective parameters to the nodes. It is here supposed that the preliminary access handling means 21B, the preliminary access decision means 2B, the service priority related handling means 61B and final access decision means 6B are included in a so called admission control means 11B which are modified as compared to a conventional implementation in order to handle the additional parameters.

FIG. 4 shows an alternative implementation with a combined core access edge packet data node, for example a CGSN or a node with the same functionality 1020 which comprises preliminary access handling means 21 receiving a network resource request from a mobile station. It is supposed that the preliminary access handling means 21 generates or holds access priority related information or fetches it from a HLR or similar (not shown), provides the access priority related parameter to preliminary access decision means $2_O$, wherein a decision is made. If the outcome of the decision is positive, i.e. preliminary access is granted, the preliminary access decision means $2_O$ provides the priority related access parameter to a final access decision means $6_O$ comprised by or communicating with service priority related information generating means $30_O$, which in this particular implementation are supposed to be included in the CGSN 1020 itself (although they may as well as in the embodiment discussed with reference to FIG. 3, be provided externally in e.g. a policy server). However in this case it is supposed that the service information priority related information generating means $30_O$ are provided in CGSN and comprise over service priority parameter generating means $40_O$ and pre-emption related information providing or holding means $50_O$. The service priority related information is used by the final access decision means $6_O$ to make a final decision whereafter (if final access is granted) the service priority related parameters are provided to the radio network.

FIG. 5 is a sequence diagram illustrating one implementation of the inventive concept in a 3G network (or a similar wireless network). Thus, it is here supposed that first an attach request, 1, is sent from a mobile station to a core access packet data node which may be an SGSN or a similar node. In a conventional manner an update location, 2, is sent to HLR which, here according to the inventive concept is supposed to include access priority related information which is subscriber related, i.e. such access priority related information, here called Access ARP, in the insert subscriber data message, 3. Then the access priority is predefined or provided in the core access PDN, indicated A in the figure. It is here supposed that an activate PDP context request, 4, is sent from the MS to the core access PDN. A preliminary access priority control is then performed in the core access PDN, B, to establish if preliminary access can be granted. If yes, a create PDP context request with Access ARP is sent to a core access edge node, 5, for example a GGSN or similar wherein again a preliminary access priority control is performed, B. If granted, a policy request which optionally contains Access ARP is sent to the policy node, 6. It is here supposed that the policy node generates policy priority related data and returns a policy response, 7, including a particular service priority related parameter which here is called service ARP, and in additional thereto capability and vulnerability parameters. A final access decision control is then made in the core access edge node, C, and if it is granted, information thereon is provided to the core access packet data node in a create PDP context response including the service related parameters, 8. A final access decision C is then made in the core access PDN as well which (if granted) sends a bearer request, 9, with the service ARP, capability, vulnerability to the RAN where a decision on access permission and resource allocation is made based on the service ARP received from the core access packet data node. After the RAN makes a decision on access permission or resource allocation (box C) a bearer response, 10, is sent back to the core access packet data node. Access permission and bandwidth allocation may here require pre-emption of other lower prioritized bearers/PDP contexts as also is done in the core access PDN (Box C) and the core access edge node (Box C). If bandwidth allocation is requested, that is done in core access edge node, Box C. Finally an activate PDP context accept message is sent from the core access PDN to the MS, 11.

Hence, for performing the inventive procedure, first the Access ARP (or similar) is received as part of the subscriber profile in the core access packet data node. A preliminary access decision is made based on Access ARP. If the network load is close to a critical limit, only high Access ARP requests are for example processed, whereby high can be defined in any appropriate manner (bandwidth admission control is not performed at the stage of preliminary access decision). Low Access ARP access is denied which means that bearer/PDP context activation is rejected.

Though it is here illustrated that the service ARP and the other service related parameters are provided in a policy node, they might alternatively be locally available in the core access edge node.

The steps A, B can be said to consist of a checking of the control plane whereas what is illustrated in Box C corresponds to a user plane control.

During the bearer context activation the network entities need to perform admission control in order to verify that resources for the bearer contexts are available. According to the present invention the admission control is split into two steps, first the temporary Access ARP admission control and in the second step the final service related and admission control, particularly a service ARP admission control.

Figure 6:
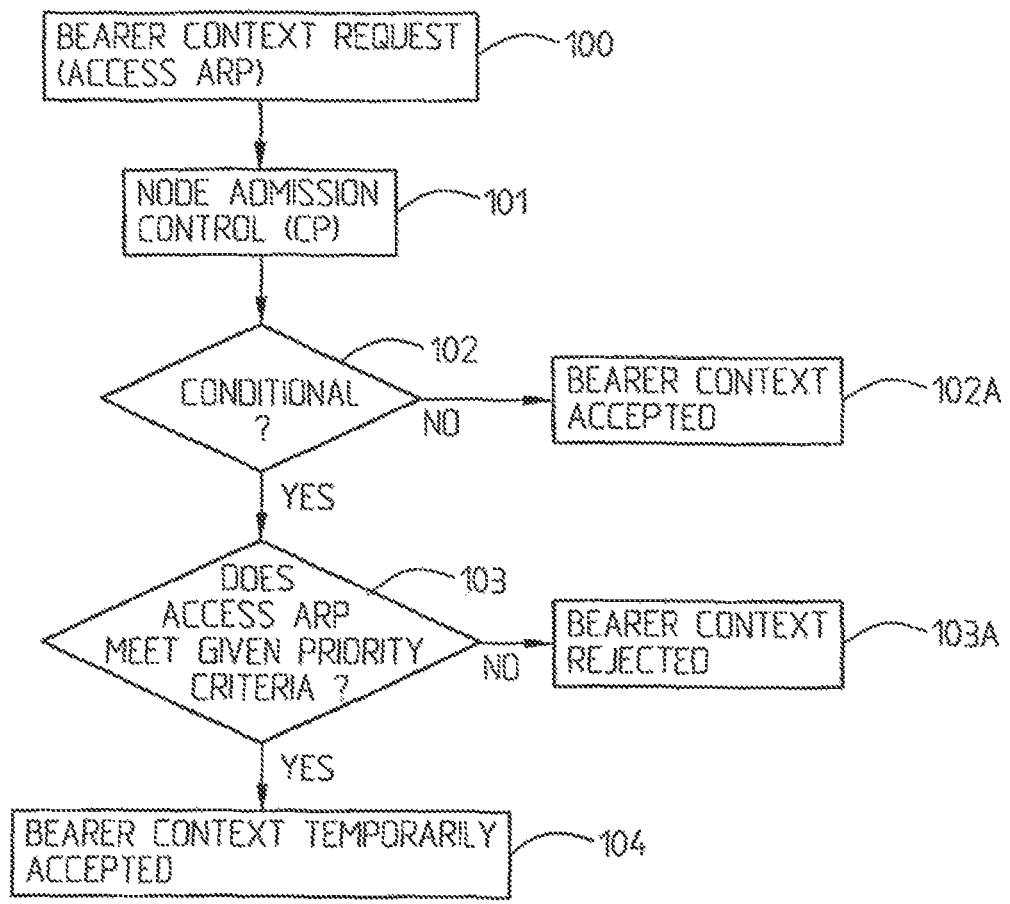

FIG. 6 is a simplified flow diagram describing the access priority related admission control based on what here is called the Access ARP. Access ARP admission control may admit a bearer request temporarily. During the access priority related (ARP) admission control only resources in the control plane (CP) are taken into account. Resources on the user plane (UP) are not taken into account at this stage but at a later stage when the service priority related information, e.g. service ARP, is available. The Access ARP allows discrimination between subscribers based on subscription data from for example HLR. Subscription data defines the initial subscriber priority without service knowledge. The process of access priority based admission control, for example Access ARP, is shown in FIG. 6. When node admission control indicates that resources are about to be exceeded, when a bearer context request (containing Access ARP) is received in the node, access admission control (CP) is initiated, 101. Then it is examined if it is conditional, 102. If not, the bearer context may be accepted, 102A. If it is conditional, it is examined if the Access ARP meet given priority criteria, 103. If not, the bearer context is rejected, 103A, if yes, a bearer context is temporarily accepted, 104. Thus the Access ARP is used to decide, if the resources are scarce or about to be exceeded, if the bearer context shall be temporarily accepted or not. It should be clear that temporary permission does not guarantee final acceptance. Temporary permission can be given to bearer contexts which are described by subscription data as more important than other. Given the Access ARP does not give the bearer context enough priority, the bearer context is rejected and the bearer context can therefore not be established.

Figure 7:
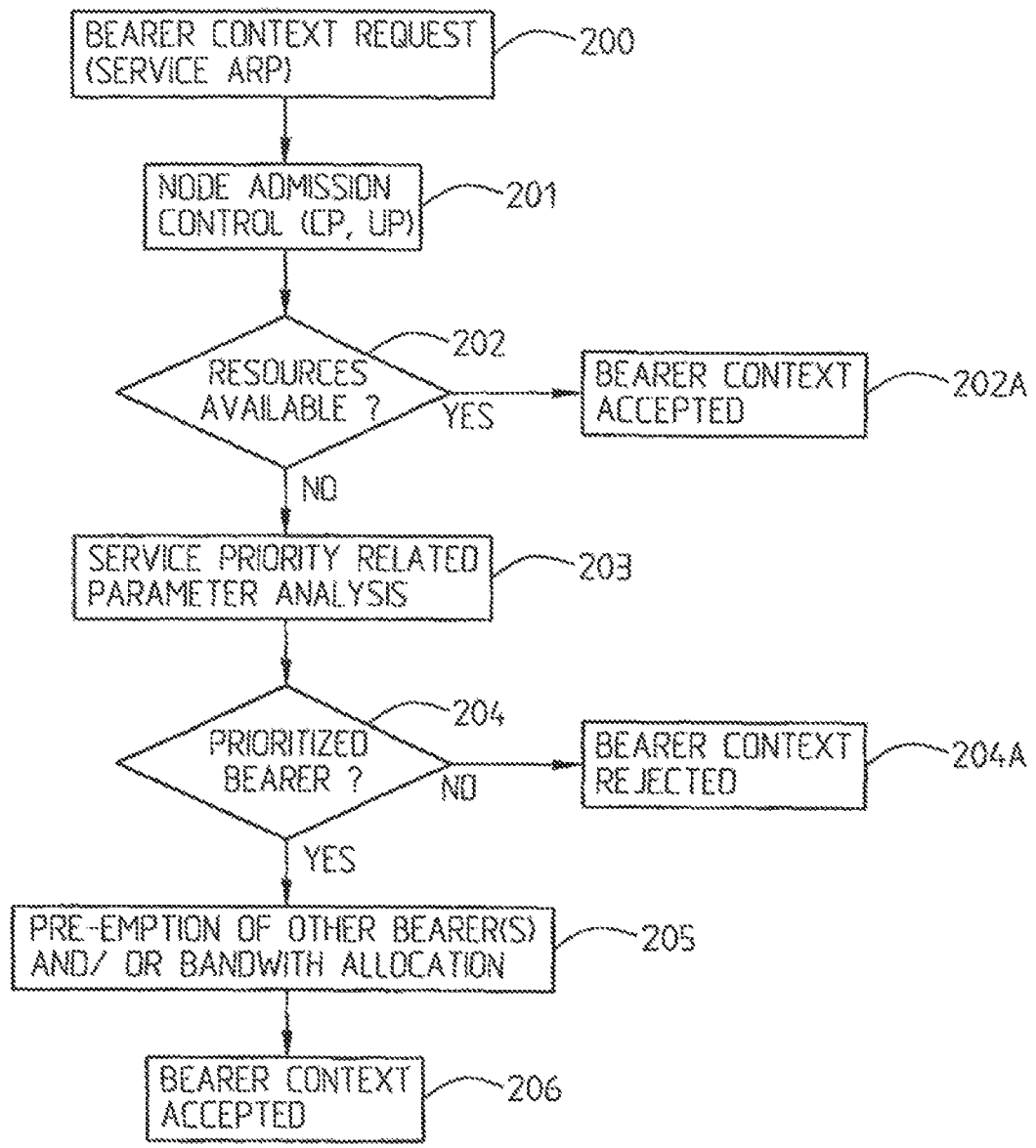

When the service priority related information, for example service ARP and possibly for example pre-emption allowability/capability parameters are received in the respective network entities, or nodes, the respective final node admission control is carried out, cf. FIG. 7. Node admission control may target both the control plane and the user plane. The control plane keeps information describing the bearer context, while bandwidth allocations are done on the user plane. Given admission control on the user plane is done if bandwidth guarantees need to be given to a bearer context, while admission control on the control plane always is performed.

Thus in FIG. 7, it is supposed that the bearer context request (with Access ARP) is received, 200 (which presupposes that preliminary access has been granted). Then a node admission control is performed particularly on control plane as well as user plane, 201. If resources are available, 202, the bearer context is accepted, 202A. If not, the service priority related parameters are analyzed, particularly service ARP, 203. The received bearer context service ARP is evaluated to establish the importance of it compared to other established bearer contexts, here denoted prioritized bearer establishment, 204. Given there is at least one bearer context with a lower service ARP, the identified bearer context is pre-empted, 205. If it is not a prioritized bearer, the bearer context is rejected, 204A. The pre-emption process continues until the requested resources for the new bearer context are available, 205. If another bearer is found which has a lower service ARP and can be pre-empted, this is done, and the bearer context is accepted, 206. If no established bearer context with a lower service ARP can be found, the new bearer context has to be rejected and the bearer context can not be established.

Service related priority handling is access agnostic whereas access ARP to a large extent relies on 3GPP like systems, which means that actually it is not necessary to perform the steps of FIG. 6, in for example broadband networks.

Policy rules among other things define the importance of a service (service ARP) compared to other services. A service ARP may depend on the subscriber category to which the subscriber belongs. This means that the service APR may be different among subscriber categories using one and the same service. The intention is to be able to discriminate among subscriber categories when available resources become an issue. Policy rules can either be provisioned from a policy server (PCRF) or locally configured in e.g. the access edge node. The rules can match one or more services and are applied in a bearer context request procedure. A service class comprises rules for service ARP, QoS, service description, for example port numbers, IP address etc.

It is an advantage of the invention that service awareness in the network is increased and particularly it is advantageous in that it allows discriminating between user categories using the same service. It is also an advantage of the invention that it allows the network to guarantee access to resources in emergency situations and under exceptional network load conditions, which is a pre-requisite for IP networks to be able to handle emergency services or VIP user categories in a satisfactory manner. It also adds a mechanism to IP networks to give reliability to services in an end-to-end fashion. Further it adds an important mechanism to handle emergency services, voice as well as data, over packet switched networks and it is capable of adding service awareness to IP networks. It further enhances service reliability in an end-to-end fashion and it is applicable to all kind of IP networks, wireless as well as broadband networks.

The invention claimed is:

1. A core network access node being a core network access packet data node or a core network access edge node in a communication network that supports communication of packet data, the core network access node comprising:
    means for holding access priority related information, wherein the access priority related information comprising a subscriber related access priority allocation parameter relating to a subscriber requesting a network resource comprising a bearer or a communication path, that the means for holding the access priority related information further comprises holding information about current network load; and,
    preliminary access handling means comprising preliminary access decision means configured to be in communication with said means for holding the access priority related information, and configured to make a preliminary decision whether a network resource request is to be handled or rejected based on said access priority related information and said current network load, that the preliminary access handling means further comprises service allocation priority handling means for holding service priority related information comprising one or more parameters generated based on service importance or service importance and user or subscriber category, and final decision means for making a final decision relating to a grant or reject of a request for a network resource given preliminary access.

2. The core network access node according to claim 1, wherein the core network access packet data node comprises a packet data support node of a wireless network.

3. The core network access node according to claim 1, wherein the core network access packet data node comprises a combined packet data support and gateway node of a wireless network.

4. A core network access node according to claim 1, wherein the core network access packet data node comprises a node of a broadband network.

5. The core network access node according to claim 1, wherein the core network access packet data node is configured to provide the access priority allocation to the core access edge node, to receive the service priority related information parameters from the core access edge node, to base the final decision on said service priority related information parameters, and to provide said service priority related information parameters to a radio access network node.

6. The core network access node according to claim 1, wherein the core network access edge node comprises a packet data gateway node.

7. The core network access node according to claim 1, wherein the core network access edge node comprises a node of a broadband network.

8. The core network access node according to claim 1, wherein the core network access edge node is configured to send a policy request including the access priority allocation priority parameter to a policy node, and to handle the network resource request with a policy including service priority related parameters from the policy node.

9. The core network access node according to claim 1, wherein the subscriber related access priority allocation parameter comprises an Allocation Retention Priority (ARP).

10. The core network access node according to claim 1, wherein the service priority related information in addition to a service priority related parameter further comprises a pre-emption allowability parameter and a pre-emption capability parameter.

11. The core network access node according to claim 1, wherein based on the current network load exceeding a given load threshold value, the preliminary access decision means is configured to (1) reject network resource requests for which the access allocation priority parameter is below a given value or for a given relationship between the load threshold value and the access allocation priority parameter value, or to (2) allow network resource requests for which the access allocation priority parameter is over a given value or for a given relationship between the load threshold value and the access allocation priority parameter value.

12. A method in a core network access node being a core network access packet data node or a core network access edge node in a communication network that supports communication of packet data, the method comprising:
holding access priority related information comprising a subscriber related access priority allocation parameter relating to a subscriber requesting a network resource comprising a bearer or a communication path, that the step of holding further comprises holding information about current network load; and,
a preliminary access handling step comprising a preliminary access decision step for making a preliminary decision whether a network resource request is to be handled or rejected based on said access priority related information and said current network load, that the preliminary access handling step further comprises a service allocation priority handling step for holding service priority related information comprising one or more parameters generated based on service importance or service importance and user or subscriber category, and a final decision step for making a final decision relating to a grant or reject of a request for a network resource given preliminary access.

13. The method to claim 12, wherein the core network access packet data node comprises a packet data support node of a wireless network.

14. The method to claim 12, wherein the core network access packet data node comprises a combined packet data support and gateway node of a wireless network.

15. The method to claim 12, wherein the core network access packet data node comprises a node of a broadband network.

16. The method to claim 12, wherein the core network access packet data node performs steps of providing the access priority allocation to the core access edge node, receiving the service priority related information parameters from the core access edge node, basing the final decision on said service priority related information parameters, and providing said service priority related information parameters to a radio access network node.

17. The method to claim 12, wherein the core network access edge node comprises a packet data gateway node.

18. The method to claim 12, wherein the core network access edge node comprises a node of a broadband network.

19. The method to claim 18, wherein the core network access edge node performs steps of sending a policy request including the access priority allocation parameter to a policy node, and handling the network resource request with a policy including service priority related parameters from the policy node.

20. The method to claim 12, wherein the subscriber related access priority allocation parameter comprises an Allocation Retention Priority (ARP).

21. The method to claim 12, wherein the service priority related information in addition to a service priority related parameter further comprises a pre-emption allowability parameter and a pre-emption capability parameter.

22. The method to claim 12, wherein based on the current network load exceeding a given load threshold value the preliminary access decision step further comprises: (1) rejecting network resource requests for which the access allocation priority parameter is below a given value or for a given relationship between the load threshold value and the access allocation priority parameter value, or (2) allowing network resource requests for which the access allocation priority parameter is over a given value or for a given relationship between the load threshold value and the access allocation priority parameter value.

23. The core network access node of claim 1, wherein the means for holding access priority related information further comprises receiving the access priority related information.

24. The core network access node of claim 1, wherein the means for holding access priority related information further comprises communicating with network load information means to fetch information about the current network load.

25. The core network access node of claim 1, wherein the service allocation priority handling means further comprises receiving the service priority related information.

26. The method of claim 12, wherein the step of holding the access priority related information further comprises receiving the access priority related information.

27. The method of claim 12, wherein the step of holding the access priority related information further comprises communicating with a network load information unit to fetch information about the current network load.

28. The method of claim 12, wherein the service allocation priority handling step further comprises receiving the service priority related information.

* * * * *

UNITED STATES PATENT AND TRADEMARK OFFICE
CERTIFICATE OF CORRECTION

PATENT NO.         : 9,705,928 B2
APPLICATION NO.    : 14/951601
DATED              : July 11, 2017
INVENTOR(S)        : Kopplin It is certified that error appears in the above-identified patent and that said Letters Patent is hereby corrected as shown below:

On the Title Page

In Item (56), under "FOREIGN PATENT DOCUMENTS", in Column 2, Line 1, delete "A" and insert -- A1 --, therefor.

In the Specification

In Column 1, Line 8, delete "U.S." and insert -- now U.S. --, therefor.

In Column 1, Line 41, delete "Multimedia System" and insert -- Multimedia Subsystem --, therefor.

In Column 3, Line 26, delete "Management" and insert -- Multiplexer --, therefor.

In Column 3, Line 27, delete "Broadband Access" and insert -- Broadband Remote Access --, therefor.

In Column 7, Line 19, delete "invention will in" and insert -- invention in --, therefor.

In Column 7, Line 50, delete "criterium" and insert -- criteria --, therefor.

In Column 9, Lines 12-13, delete "(Broadband Access Service)" and insert -- (Broadband Remote Access Server) --, therefor.

In Column 9, Line 14, delete "Management)." and insert -- Multiplexer). --, therefor.

In Column 9, Line 21, delete "core network CN" and insert -- core network (CN) --, therefor.

In Column 9, Line 42, delete "Allocation Retention Priority ARP," and insert -- Allocation Retention Priority (ARP), --, therefor.

In Column 10, Line 22, delete "policy server node $30_1$." and insert -- policy node $30_1$. --, therefor.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,705,928 B2

In Column 12, Line 9, delete "service information" and insert -- service --, therefor.

In Column 14, Line 26, delete "APR" and insert -- ARP --, therefor.

In the Claims

In Column 15, Line 22, in Claim 4, delete "A core" and insert -- The core --, therefor.

In Column 15, Line 62, in Claim 11, delete "or to" and insert -- or --, therefor.